United States Patent [19]
Day et al.

[11] Patent Number: 5,656,146
[45] Date of Patent: Aug. 12, 1997

[54] SINGLE PHASE FLUID GAS EXTRACTOR FOR ELECTROPHORETIC PURIFIER SYSTEMS

[75] Inventors: Gene F. Day, Hillsborough; Ronald B. Finley, San Francisco, both of Calif.

[73] Assignee: Phoenix Precision Graphics, Inc., Sunnyvale, Calif.

[21] Appl. No.: 638,527

[22] Filed: Apr. 26, 1996

[51] Int. Cl.$^6$ ................................................ C25B 7/00
[52] U.S. Cl. ........................................ 204/648; 204/553
[58] Field of Search ............................ 204/648, 649, 204/650, 660, 661, 662, 663, 664, 665, 666, 667, 668, 669, 670, 671, 672, 673, 674, 553, 554, 555, 556, 557, 558, 559, 560, 561, 562, 563, 564, 565, 567, 568, 569, 570, 571, 572, 573

[56] References Cited

U.S. PATENT DOCUMENTS

| | | | |
|---|---|---|---|
| 4,799,452 | 1/1989 | Day | 399/225 |
| 4,895,103 | 1/1990 | Day | 399/225 |
| 4,923,581 | 5/1990 | Day | 204/571 |
| 5,346,000 | 9/1994 | Schlitt | 165/104.26 |
| 5,404,210 | 4/1995 | Day | 399/225 |
| 5,426,459 | 6/1995 | Kaplinsky | 347/87 |
| 5,457,485 | 10/1995 | Moriyama et al. | 347/92 |
| 5,514,259 | 5/1996 | Day et al. | 204/660 |

Primary Examiner—Kathryn L. Gorgos
Assistant Examiner—John S. Starsiak, Jr.
Attorney, Agent, or Firm—Thomas Schneck

[57] ABSTRACT

An electrophoretic purifying system employing a gas/bubble filter is described, with the gas/bubble filter disposed in the path of a single phase liquid flow moving toward an electrophoretic purifier. The gas/bubble filter prevents bubbles, having a predetermined diameter, from entering the electrophoretic purifier. A rotating drum electrophoretic purifier is employed in which a rotating drum is in close proximity to a repelling electrode, defining a gap therebetween. The repelling electrode may be shaped as a cylindrical trough which houses an arcuate portion of the drum. Alternatively, the interior surface of the cylindrical trough may comprise of a repelling electrode. The gap is in fluid communication with a fluid outlet of a supply tank containing liquid having contaminants. The gas/bubble filter is disposed proximate to the fluid outlet, and the liquid flows therethrough to be purified. The gas/bubble filter includes a plurality of apertures, with each of the plurality of apertures being of appropriate size to block gas bubbles having a diameter within a predetermined range. In this manner, the liquid having contaminants is introduced into the gap and is substantially free of said gas bubbles. This prevents arcing which substantially improves the filtering efficiency of the electrophoretic purifier by maintaining a constant potential across the gap.

20 Claims, 4 Drawing Sheets

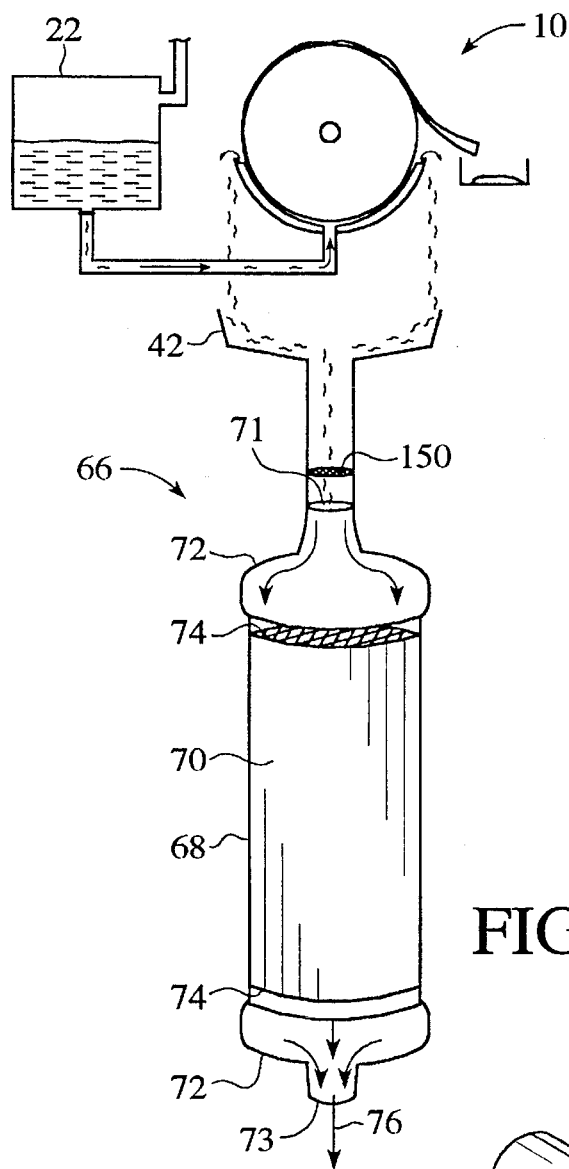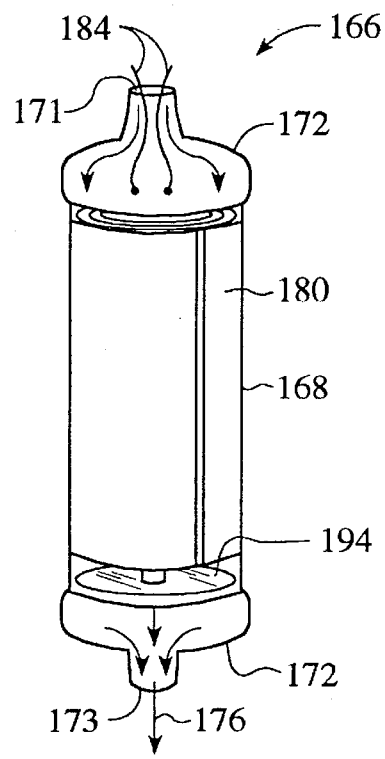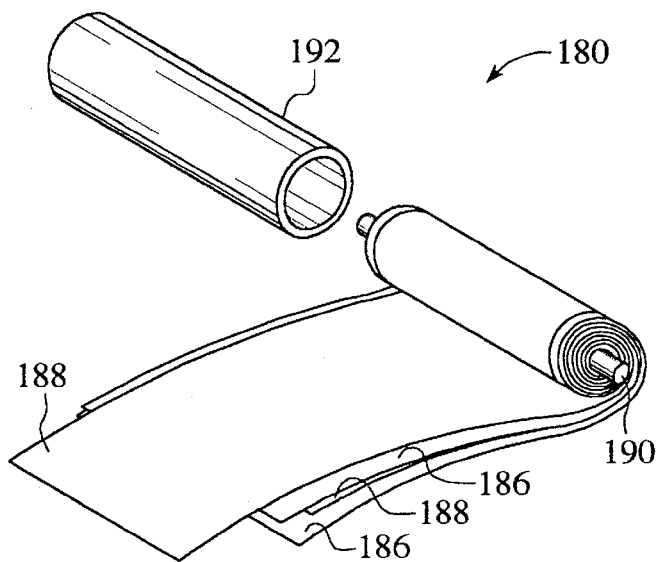
FIG. 5
FIG. 6
FIG. 7

SINGLE PHASE FLUID GAS EXTRACTOR FOR ELECTROPHORETIC PURIFIER SYSTEMS

TECHNICAL FIELD

The present invention relates to systems and methods for purifying liquids, and more particularly to the purification of liquid toners used in electrostatic printing.

BACKGROUND ART

Disposal of spent toners has long been a major problem for users of electrostatic plotters, printers and copiers. Environmental awareness, disposal costs, and strict governmental regulations relating to chemical handling and disposal have threatened the present manner of use of liquid toners. Purifying of toners presents a viable answer to these problems by reducing disposal amounts by allowing reuse of some of the toner. Presently, many prior attempts have been made to purify toners and other liquids.

In U.S. Pat. No. 5,457,485 to Moriyama et al., an ink jet recording apparatus is disclosed in which a screen filter is disposed across a flow of ink. Operationally associated with the screen is a movable baffle. The movable baffle periodically moves into abutting relationship with the screen filter. In this manner, a substantial portion of the screen may be blocked, thereby creating a large pressure differential between the opposed sides of the screen, allowing bubbles to pass therethrough. This design allows the screen to sequentially block and transmit bubbles, depending upon flow direction.

U.S. Pat. No. 5,426,459 to Kaplinsky discloses a thermal ink-jet pen cartridge having a check valve formed from a mesh having very small openings. The mesh openings are of sufficient size to prevent air bubbles from passing through under normal pressures. The check valve also serves to function as a particulate filter to prevent contamination of a printhead by particles from the ink reservoir.

U.S. Pat. No. 5,346,000 to Schlitt discloses a heat pipe equipped with a bubble trap. The bubble trap includes a baffle that restricts the liquid flow in a liquid flow channel of the heat pipe, as well as a wire mesh. The wire mesh is positioned downstream from the baffle to entrap bubbles.

U.S. Pat. Nos. 4,799,452; 4,895,103 and 4,923,581, all to G. F. Day, disclose methods for filtering liquid toner while eliminating the need for liquid toner disposal. In these methods, the toner itself is eliminated except for a transitory existence just at the moment of toning. Concentrated "ink" of each color is stored in a small tank and injected into and mixed with a continuous stream of clear dispersant. The resulting toner stream is passed through the toner applicator and then quickly decomposed back into concentrate and dispersant. This is achieved electrophoretically with a purifier, described in the above-referenced patents. The solid pigment particles are plated out on a rotating drum, then scraped off the drum and re-dispersed by vigorous mixing into the concentrate holding tank. To stop the toning process, the injection of the selected concentrate is simply terminated.

It would seem that this recycling concept might provide a liquid toning technology free of disposal problems since a large volume of contaminated or spent toner would never exist. However, the basic cause of disposal is not eliminated. Eventually, the contents of the concentrate tanks would have to be discarded due to contamination, as would the fluid in the dispersant tank. This is because the contaminants are re-mixed with the dispersant along with the pigment particles and are, therefore, never removed from the system. The quantity of liquid to be thrown away would be smaller, but some disposal problems would remain. The dispersant would have to be discarded when the conductivity level became high enough to interfere with image toning. A much higher level of contamination could be tolerated in the color concentrate tanks because of the dilution upon injection into the dispersant stream, but eventually the concentrate would also need replacement. In addition, the recycling architecture is relatively complex. It requires precise metering and mixing of two fluid streams and high speed separation of the toner into its components as it flows out of its applicator. With the high flows which are characteristic of full-width toner applicators, the separation apparatus must be quite large and, therefore, costly.

In order to electrophoretically separate a toner stream into its components, the fluid is passed between two closely spaced, parallel electrodes while a high voltage is imposed across the gap. All of the fluid must be exposed to the full electric field, and this means the flow must normally be confined to the gap region with some kind of fluid seals along the lateral edges of the separation zone. One of the electrodes should be moving so that the accumulating sludge can be scraped off and sent to the appropriate concentrate tank. The seals which confine the fluid flow within the gap present numerous technical difficulties.

Commonly assigned U.S. Pat. No. 5,404,210 describes an electrophoretic filtering method and apparatus which continuously purifies small portions of liquid toner by using a rotating drum type to keep contamination below the level at which it will interfere with imaging. Spaced-apart from the rotating drum is a conductive electrode with the drum and electrode defining a gap therebetween. Rotating drum-type purifiers are effective at removing solid contaminants such as particles of color pigment, paper debris, and ions from the fluid dispersant. This requires a high voltage potential being present across the gap. The apparatus would benefit from a higher level of purification for each pass, which could be achieved by increasing the voltage potential across the gap. However, electrical breakdown keeps the applied voltage lower than would otherwise be desired. The reduced voltage potential necessitates a very large purifier for any given flow rate to assure substantial separation of the solids from the clear fluid.

It is an object, therefore, of the present invention to provided an improved electrophoretic purifying system with an approach to reduce electrical breakdown between electrodes.

It is another object to provide a purification system which is of reduced size and increased efficiency.

BEST MODE FOR CARRYING OUT THE INVENTION

The above objects have been achieved with a gas/bubble filter disposed in the path of a single phase liquid flow moving toward an electrophoretic purifier. By filtering bubbles, electrical breakdown is reduced. A rotating drum electrophoretic purifier is employed in which a rotating body is in close proximity to a repelling electrode, defining a gap therebetween. The repelling electrode may be shaped as a cylindrical trough which houses an arcuate portion of the body. Alternatively, the interior surface of the cylindrical trough may comprise of a repelling electrode. The gap is in fluid communication with a fluid outlet of a supply tank containing liquid having contaminants. The gas filter is disposed proximate to the fluid outlet and the liquid flows therethrough to be purified. The gas filter includes a plurality of apertures, with each of the plurality of apertures being of appropriate size to block gas bubbles having a diameter within a predetermined range. In this manner, the liquid having contaminants is introduced into the gap and is substantially free of gas bubbles having a diameter within the predetermined range. A voltage applied to the repelling electrode causes contaminants present in the liquid, i.e. mostly solids such as color pigment particles, in the case of liquid toner, to plate onto the surface of the rotating body. The body removes the contaminants, disposed thereon, from the gap, leaving semi-purified liquid which is substantially free from particulate contaminants. The contaminants may then be scraped off the body surface for disposal. The liquid is introduced continuously through an aperture positioned at the nadir of the electrode, centered at the bottom of the same. The semi-purified liquid bifurcates into two flows, each of which travels over the opposed edges of the electrode, spilling into a large funnel.

In a first embodiment, the semi-purified liquid exiting the funnel is collected in a receptacle. The liquid collected in the receptacle is suitable for reuse, where it is stored until needed, for example, as clear fluid dispersant for color concentrate of a liquid toner.

In a second embodiment, the semi-purified liquid passes through the funnel and into a second purifier formed from a container housing a porous contaminant-retentive material. The container includes an opening to allow semi-purified fluid to enter. Disposed opposite to the opening is a liquid outlet, allowing liquid to exit therefrom. The semi-purified liquid flows through the housing and passes through the porous material which contacts and retains the remaining contaminants, as by absorption, adsorption, or chemical binding. These contaminants may be ions generated by spontaneous ionization of molecules which were neutral during their transit across the gap of the drum purifier, or they may be neutral molecules. Liquid exiting the second purifier is substantially free of both particulate and non-particulate contaminants, defining purified liquid. The purified liquid exiting the second purifier is highly insulating and is suitable for reuse. The liquid is collected as discussed above with respect to the first embodiment.

In a third embodiment, the second purifier includes a filter-type spiral having an elongated laminate preferably comprised of two electrically insulating, but porous, layers interleaved with two thin conductive layers. The laminate is spirally wound around a shaft and housed within a tightly-fitting cylinder having an opening for liquid inlet at one end and an opening for liquid outlet at the other end. After the liquid has passed through the drum purifier and solid contaminants have been removed, it flows axially through the cylindrical housing and passes through the axial length of the spiral laminate by flowing through the porous layers between the thin conductive layers. A voltage applied between the two conductive layers causes remaining contaminants, which are mostly ions generated by spontaneous ionization of molecules which were neutral during their transit through the gap of the drum separator, to be deposited on one or both of the conductive layers. The spiral laminate is of sufficient axial length and comprises numerous windings of its layers so that liquid passing through it is exposed to an electrical field for a long period of time and over a large area. The long time period allows the neutral, but ionizable, molecules to spontaneously ionize so that they can be effectively removed from the liquid. The liquid that exits the second separator is highly insulating and is suitable for reuse, for example as the clear fluid dispersant for color concentrate of a liquid toner.

BRIEF DESCRIPTION OF THE DRAWINGS

FIG. 5 is a plan view of a purification system with sequential electrophoretic and particulate filter purifiers employing the present invention.

FIG. 6 shows another embodiment of the particulate purifier shown in FIG. 5 including a spiral laminate, in accord with an alternate embodiment.

FIG. 7 is a detailed view of the spiral laminate shown in FIG. 6.

BEST MODE FOR CARRYING OUT THE INVENTION

Figure 1:
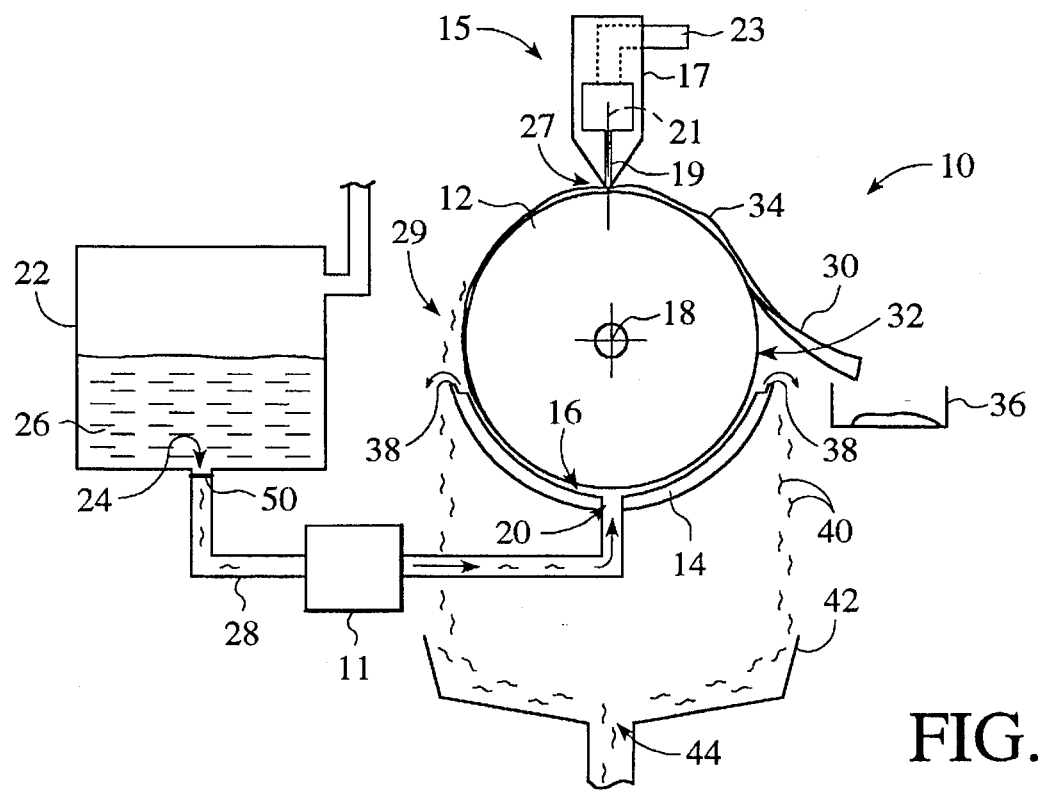
FIG. 1 shows a plan view of a purification system with a rotating drum-type electrophoretic purifier employing the present invention.

With reference to FIG. 1, a drum purifier 10 is shown as including a rotating body 12 and an electrode 14 spaced-apart from body 12, defining a gap 16 therebetween. Body 12 is disposed to rotate about an axis 18 and is cylindrical in shape. Electrode 14 has a profile matching the profile of the body 12. Electrode 14 also includes a fluid inlet 20. A supply tank 22 includes a fluid outlet 24 and contains liquid 26 having contaminants. Purifier 10 is in fluid communication with supply tank 22 vis-a-vis conduit 28 extending between fluid outlet 24 and fluid inlet 20. A scraper mechanism 30 is disposed proximate to body 12. Scraper mechanism 30 may comprise of a single blade disposed to be in continuous abutting relationship with the surface 32 of body 12. Alternatively, scraper mechanism 30 may comprise of a plurality of scraper blades each of which is selectively actuated to abut against surface 32, in a manner described in U.S. Pat. No. 4,799,452, which is incorporated by reference herein. Any blade included in mechanism 30 may be formed from thin steel. Preferably, a blade included in mechanism 30 is formed from a urethane compound and of a type widely used for scraping dry powder from drums in xerographic printers and copiers.

Liquid 26 enters drum purifier 10 through fluid inlet 20 of electrode 14, filling gap 16. Electrode 14 is biased to repel particles within liquid 26 which possess a like electric charge, such as toner particles. Debris particles from the imaging paper used in electrostatic printing and other contaminants tend to acquire a charge of the same polarity as the toner particles. Both toner and debris particles move through liquid 26 in gap 16, adhering to surface 32 of body 12 as a slurry 34. As body 12 rotates, slurry 34 is removed from liquid 26 in gap 16 by scraper mechanism 30.

To facilitate separation of slurry 34 from liquid 26, an air-knife 15 may be disposed adjacent to surface 32, providing a drier deposit to be present in tray 36, making the same easier to handle. To that end, air-knife 15 must be positioned relative to blade 30, so that drum 12 passes slurry 34 by air-knife 15 before passing slurry 34 by blade 30.

Air-knife 15 includes a body 17 having an air channel 19. The longitudinal axis 21 of air channel 19 extends orthogonally to surface 32. Air channel 19 is in fluid communication with a supply of pressurized gas (not shown), i.e. air, via inlet 23 and typically extends across the entire width of drum 12. The gap width, from edge-to-edge of channel 19, is approximately 0.005 inch. An envelope of gas exits the aperture of channel 19, proximate to surface 32, at approximately 0.5 pounds-per-square-inch and is focused thereon to separate liquid 29 present in slurry 34. The aperture is positioned approximately 0.015 inch away from surface 32. To prevent back pressure from developing in channel 19, the body 17, proximate to surface 32, tapers upwardly away therefrom, forming an angled portion. In this fashion, air exiting channel 19 separates a substantial amount of liquid 29 present in slurry 34, allowing it to return to gap 16 or flow into funnel 42.

Figure 2:
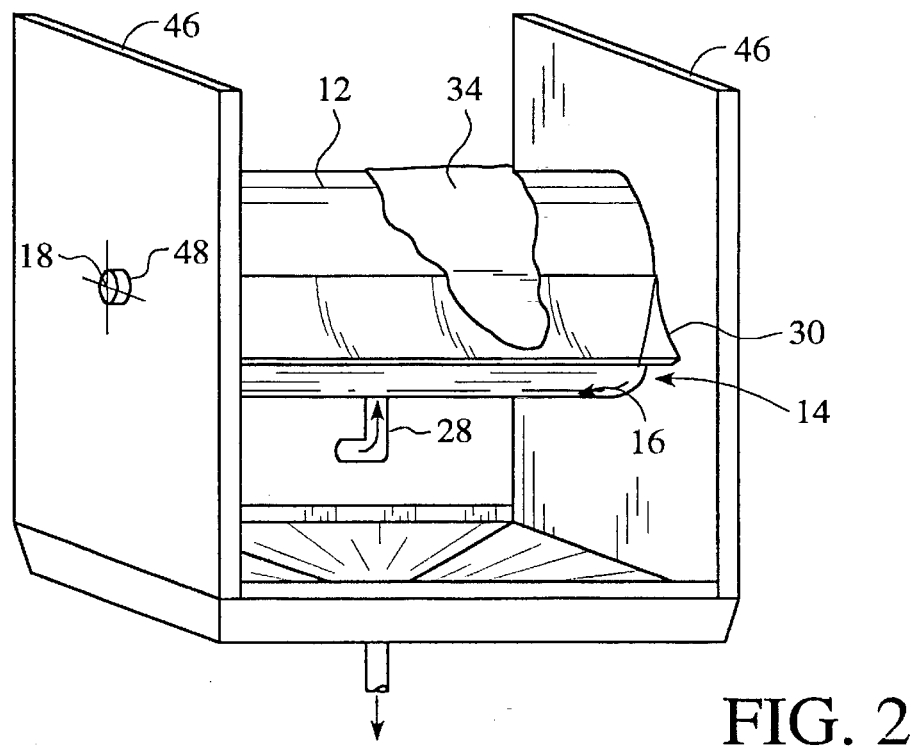
FIG. 2 shows a perspective view of the drum purifier shown in FIG. 1.

Referring also to FIG. 2, body 12 is disposed between spaced-apart side plates 46, which position the various components relative to each other. An axle 48, which defines axis 18, is connected to a gear motor, not shown, to rotate body 12. Body 12 is preferably 3.5 inches in diameter and 3.5 inches in length, but the aforementioned dimensions may be varied for other applications. Repelling electrode 14 covers approximately 120° of the bottom of body 12, forming an arcuate trough with its end edges at the same height as its lateral edges. Alternatively, repelling electrode 14 may be housed within the interior surface of a trough or other means of containing liquid and keeping electrode 14 in close electrical communication with body 12. Gap 16 is approximately 0.015 inch in width. The applied voltage is approximately 2200 volts corresponding to a field of about 147,000 volts per inch. Different combinations of gap width and voltage may be used, but this combination is practical from the standpoint of flow capability. Wider gaps require higher voltage and are more prone to electrical breakdown. Narrower gaps can restrict the liquid flow too much.

Figure 3:
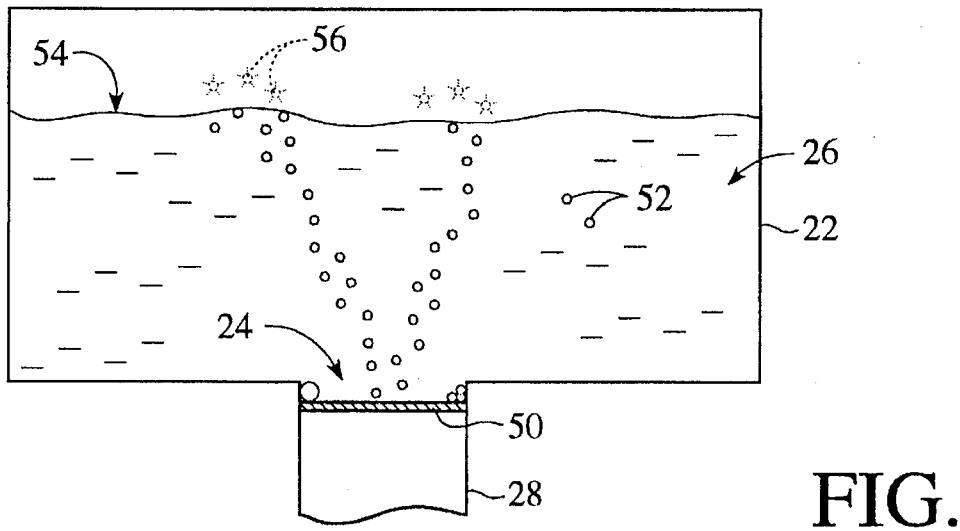
FIG. 3 shows a cross-sectional view of a preferred embodiment of a gas/bubble filter employed by the liquid supply tank shown in FIG. 1.

Referring also to FIG. 3, generally, gap 16 should be in the range 0.010 to 0.025 inch and the applied voltage in the range of 1000 to 4000 volts, but other combinations may be practical, depending on the size of body 12 and the characteristics of the liquid to be purified. It is preferred to maintain as high a voltage as possible in order to efficiently remove charged contaminants. It was discovered, however, that gas bubbles present in liquid 26 tend to break down electrically and produce an arc when exposed to the applied voltage in gap 16. The arc creates a momentary drop in voltage which reduces the purification efficiency, i.e., purification action is essentially halted during the momentary reduction in voltage. Although the applied voltage could be reduced to prevent arcing, such a reduction would decrease purification efficiency. To overcome problems with bubbles, a gas/bubble filter 50 is disposed in the path of liquid 26 moving through fluid outlet 24. Although filter 50 may be disposed anywhere along the flow path preceding drum purifier 10, it is preferred that filter 50 be disposed proximate to fluid outlet 24. In this manner, a single phase flow moves across filter 50, and bubbles 52 present in liquid 26, accumulating on filter 50, may easily move upward toward the top 54 of liquid 26. Upon reaching top 54 of liquid 26, a bubble may escape into the atmosphere, shown as 56.

Figure 4:
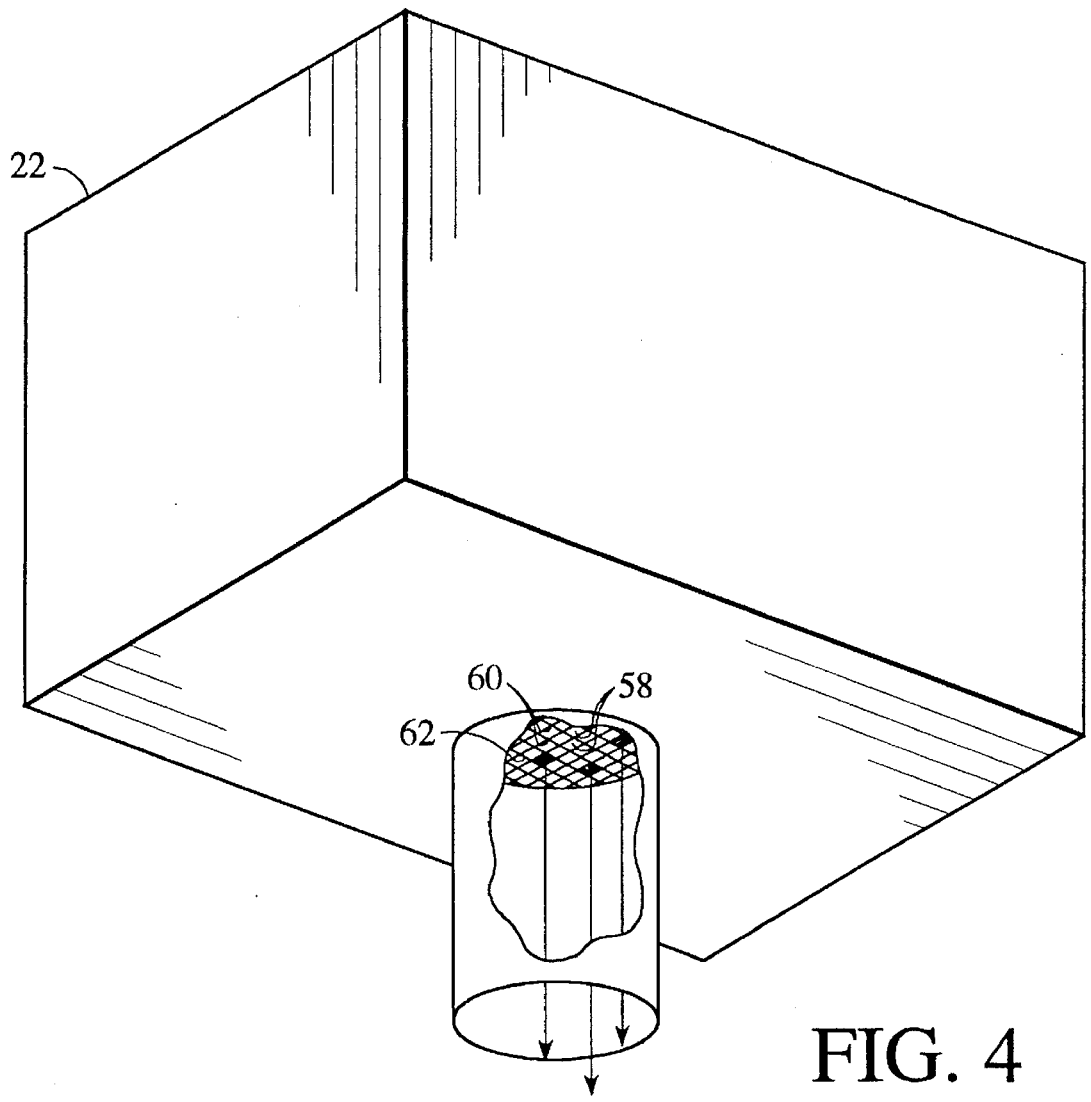
FIG. 4 is a perspective view showing the gas/bubble filter of FIG. 3.

Referring also to FIG. 4, filter 50 includes a plurality of apertures 58, with each of the plurality of apertures 58 being of appropriate size to block bubbles 52 having a diameter greater than or equal to 0.0029 inch. To that end, filter 50 comprises of a nylon screen with the plurality of apertures 58 formed from a plurality of intersections 60 of thread 62 having a diameter of 0.002 inch. This type of material is available from McMaster-Carr Supply Company. With filter 50, liquid 26 introduced into gap 16 is substantially free of bubbles 52 having a diameter greater than 0.0029 inch, and no arcing is observed. To further reduce the chance of electrical break-down of liquid 26, opposed edges 38 may be formed so that gap 16 is approximately 0.060 inch in width, as shown in FIG. 2.

Referring to FIGS. 1–4, in operation, each blade of mechanism 30 extends across the entire length of body 12's cylindrical surface. This allows mechanism 30 to clean surface 32 and prepare body 12 for further plating of contaminants on a subsequent pass across gap 16. After being removed from surface 32, slurry 34 is collected in a waste tray 36, disposed at one end of mechanism 30. Liquid remaining in gap 16 eventually spills over opposed edges 38 of electrode 14 as more liquid flows through conduit 28. Liquid spilling over opposed edges 38 is substantially free of particulate contaminants, forming a semi-purified liquid 40. The semi-purified liquid 40 is collected by a catch funnel 42 which is positioned below electrode 14. In this fashion, gravity moves semi-purified fluid 40 into funnel 42. Funnel 42 preferably has sloped sides and a central opening 44 which allows for drainage of the partially-purified liquid 40 from drum purifier 10. After exiting central opening 44, semi-purified liquid may be collected in a receptacle, not shown, where it is stored until needed again for use. The flow rate of liquid 40 is equal to the flow rate of liquid 26 through fluid inlet 20 and may be adjusted so that the contaminants are plated out before the fluid reaches the lateral edges of body 12. Typically, a pump 11 is in fluid communication with conduit 28 to move liquid 26 therethrough at approximately 0.35 gallons/minute. However, liquid 26 may be fed through conduit 28 via gravity. To achieve gravity feed, supply tank 22 would be at approximately the same level as drum purifier 10, or higher. The top of opposed edges 38 are positioned somewhat above fluid outlet 24 so that supply tank 22 never empties completely into gap 16. This insures that gap 16 remains filled, up to the opposed edges 38, with liquid 26 to prevent air from ingressing therein, which also prevents arcing.

In the case of liquid toner, isopar G, a volatile petroleum product available from Exxon Corp., often serves as the clear fluid dispersant for color concentrate particles. The drum purifier operates at a rotational rate of approximately 7 rpm, which is sufficient time to enable liquid 26, removed from gap 16 by surface 32, to return to gap 16, leaving viscous slurry 34 on surface 32. Slurry 34 moves slowly toward scraper mechanism 30 at a rate to allow any liquid contained therein to partially evaporate. Thus, the contaminants removed by drum purifier 10 dry into chunks which easily break off and fall into waste tray 36. Waste tray 36 is removable for periodic emptying.

FIGS. 5 shows an alternate embodiment of the system in which a second purifier 66 is disposed to receive semi-purified fluid 40 exiting central opening 44. Second purifier 66 is configured to remove molecules that are neutral or that have ionized since leaving drum purifier 10. Second purifier 66 typically includes a housing 68 containing a packed bed of a porous material 70 that is particulate or granular, and through which liquid 40 can pass.

Porous material 70 is preferably activated charcoal, available from American Norit Corp., which is economical and effective at removing a large number of chemical species from liquids. Other appropriate porous materials include diatomaceous earth and zeolite, which is available from Union Carbide Co. Similar materials which have a large surface area and which remove contaminants from a liquid via absorption, adsorption, or chemical binding may be substituted. "Contaminant-retentive" as used here signifies retention via absorption, adsorption, or chemical binding. The grains that make up the porous material 316 are preferably in the range of 0.0004 to 0.04 inch. Smaller grains tend to impede liquid flow through the purifier. Larger grains do not provide good exposure of all portions of the liquid to the surfaces of the grains within porous material 70.

Porous material 70 need not completely fill housing 68, but preferably completely fill a cross section of the same so that all liquid 40 flowing through second purifier 66 traverses porous material 70. On each end of housing 68, end caps 72 are disposed. Each end cap 72 includes opening for liquid inlet 71 and outlet 73. Preferably, housing 68 also includes screens 74, which are disposed proximate to each end cap 72 to allow passage of liquid 40, while retaining porous material 70 within housing 68. To that end, porous material 70 is typically wedged between screens 74, with liquid emerging from outlet 73 defining highly purified liquid 76. Purified liquid 76 is substantially free of both particulate and non-particulate contaminants and is collected by a receptacle, not shown, so that it may be reused, e.g. as fresh fluid dispersant. Color concentrate particles may be added to liquid 76 for the creation of liquid toner.

For liquid toner purification, second purifier 66 is preferably approximately four inches in axial length and four inches in diameter. These dimensions and shapes may be adjusted as appropriate for the application. The porous material 70 also serves to counteract possible discoloration of the liquid due to oxidation, in the liquid toner application. Oxidation, if excessive, can affect the imaging properties of the liquid toner. Oxidation of liquid toner can also be inhibited by chemical anti-oxidants, as is well known in the liquid toner formulations art.

Referring also to FIG. 6, in a third embodiment, second purifier 166 includes a spiral laminate 180 contained within a cylindrical housing 168 to remove molecules that have ionized since leaving drum separator 10. Spiral laminate 180 contains spirally-wound porous and conductive layers. Liquid enters spiral separator 166 through inlet 171 of an end cap 172 and passes through the porous layers of spiral laminate 180, exiting outlet 173. Liquid is subject to an electric field between the conductive layers of spiral laminate 180. This electric field results from voltage application to leads 184, each of which is connected to one of the conductive layers. Any ionic contaminants within the liquid migrate to a conductive layer, according to their net electrical charge. Liquid 176 emerging from second purifier end cap 166 is in a highly purified, insulating, stable form. It may then be reused, e.g. as fresh fluid dispersant to which color concentrate particles may be added, for the creation of liquid toner.

Referring also to FIG. 7, spiral laminate 180 is made up of alternating layers of porous material 186, such as continuous-filament polypropylene paper, available from Kimberly-Clark, and electrically conductive material 188, such as aluminum foil. Spiral laminate 180 is tightly wound around a supporting shaft 190 and then inserted into a close-fitting housing 192. The layers are attached to shaft 190 so that conductive layer 188 is first, with porous layer 186 wrapping around conductive layer 188. In this manner, conductive layer 188 occupies the innermost position in the finished spiral. As many alternating layers of laminate may be used, as desired. For convenience in winding, the leading edges of the respective layers may be taped, using insulating, self-adhering tape, to shaft 190 and to each other.

When the laminate is substantially wound, conductive layer 188 is extended around the spiral once more, providing an electrically conductive and relatively biased outer layer. This ensures that porous layers 186 are entirely sandwiched between conductive layers 188 and that liquid traveling through the porous layers of spiral laminate 180 will be subject to the electrical field throughout its traverse. Porous layers 186 are adjusted slightly in width and length as necessary to prevent conductive layers 188 from contacting each other directly and causing an electrical short.

For liquid toner purification, spiral laminate 180 is preferably approximately four inches in axial length, four inches in diameter, and wrapped around a shaft that is an aluminum rod, three-eighths of an inch in diameter. The conductive layers 188 are generally 0.001 inch thick and the porous layers 186 are 0.01 to 0.02 inch thick. The layers are of sufficient length to allow for approximately forty turns around shaft 190, in the preferred embodiment. All of these dimensions may be adjusted as appropriate for the application. Electrical leads, such as thin wires 184, are placed in contact with conductive layers 188 to bias the conductive layers relative to each other. Electrical leads 184 may extend out of second purifier 166 through an end cap 172, as shown, with inlet 171 sealed to prevent liquid leakage. As liquid passes through spiral laminate 180 it is subject to approximately 600 volts applied between electrical leads 184. Charged particles are attracted to one of the conductive layers 188, depending on their electrical charge polarity. The remaining liquid continues to pass through second purifier 166 and emerges in a substantially ionic-contaminant-free condition. Second purifier 166 may optionally contain a layer of activated charcoal 194 proximate to outlet 173 where liquid emerges therefrom. Charcoal layer 194 counteracts possible discoloration of the liquid due to oxidation, as discussed above. Screens, not shown, may be disposed within cylindrical housing 182 to separate charcoal layer 194 from spiral laminate 180, or a cloth bag containing activated charcoal may be used.

Another possible embodiment of the present invention includes the use filter 150 to block bubbles, as discussed above with respect to FIGS. 1–5. Filter 150 may be disposed proximate to second purifier 166 just before liquid exiting drum purifier 10 enters an inlet, as shown in FIG. 5. Additionally, laminate 180 may be altered to some configuration other than a spiral. A spiral winding was implemented simply to confine the various layers efficiently to a small space and because such a configuration is easy to produce.

The purification systems discussed with respect to FIGS. 5–7 are of particular utility in situations where the liquid to be purified contains charged particles, as well as neutral molecules that either ionize slowly or not at all. Use of drum purifier 10 to remove color pigment particles and other charged particles, followed by a second purifier to remove further neutral and ionic contaminants, results in a clear, highly purified liquid that is virtually free of charged particles and other contaminants and which remains highly insulating in storage. In the liquid toner example, the ionization kinetics of the contaminant molecules are relatively slow. Drum purifier 10 removes existing ionic contaminants from the liquid, but the ionized fraction of contaminant molecules is small. To remove substantially all of the contaminants, purification via drum purifier 10 is followed by the second purifier to remove neutral molecules, as well as some previously neutral molecules that have become ionized are thereby removed.

The purifier system and method of the present invention may be used to purify for reuse liquid toners which have been removed from electrostatic printing systems. This may be done by using the purifiers discussed above in a location removed from the electrostatic printing system. The purified dispersant may then be used for mixing new toners, for return to a toner manufacturer for credit towards a new toner purchase, or to enhance the purity of newly purchased dispersant. Another manner of carrying out the present invention is by incorporating the purification system into a continuous electrostatic printing and toner purification system.

Figure 8:
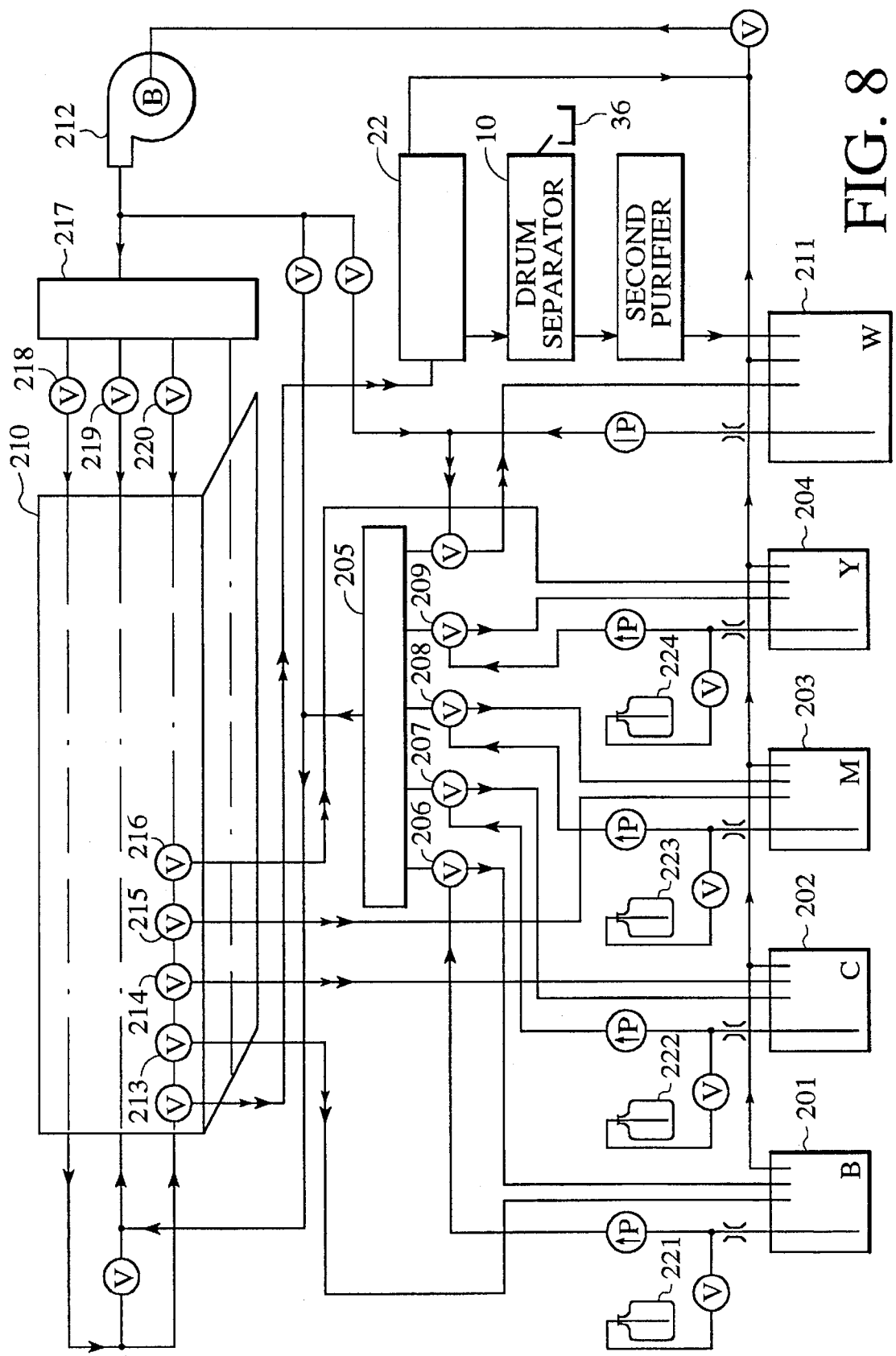
FIG. 8 is a schematic view of an electrostatic printing system utilizing the purification system of the present invention.

FIG. 8 shows a continuous electrostatic printing and toner purification system. Large arrows indicate liquid flow and small arrows indicate air flow. The lines that contain both large and small arrows carry both liquid and air. The colors black, cyan, magenta, and yellow are typically used in a four-color printing system and are shown in toner receptacles 201–204, respectively. The color toners are continually pumped out of their toner receptacles and circulated up to the region of input selector manifold 205. When a particular color is to be used, the valve 206–209 corresponding to the color is opened and the color toner enters input selector manifold 205. From there, it is directed to toning applicator 210 which contacts the paper or other printing surface and which may extend the full width of the web upon which the printing will occur. Receptacle 211 contains wash fluid, i.e. the same clear fluid dispersant, such as isopar G, that is used to disperse color pigment particles to make the color toners contained in toner receptacles 201–204. The wash fluid is circulated and in connection with input selector manifold 205 in the same manner as the color toners.

After a color toner has been applied to paper via toning applicator 210, the liquid remaining within toning applicator 210 is substantially removed by an air purge loop having its source at blower 212. The color toner is drained back into the appropriate toner receptacle through the operation of the air purge and the appropriate valve 213–216. Approximately 0.17 U.S. fluid ounce of color toner is purposely left behind in toning applicator 210. Then toning applicator 210 is washed via a pass of approximately 10.5 U.S. fluid ounces of wash fluid which carries away the 0.17 U.S. fluid ounce of color toner left behind in toning applicator 210 from the previous color pass. The dirty wash fluid then drains into holding supply tank 22 before it enters into the purification system of the present invention. The next color toning pass is started by the opening of one of the valves 206–209, flow of the selected color into input selector manifold 205, and input of the color toner into toning applicator 210, as with the previous color pass. Wash fluid passes occur between color passes so that there is no cross-contamination of the different color toners. Generally, four-color printing occurs via separate color passes in a dark to light sequence, so the typical order of liquid usage is as follows: black toner, wash, cyan toner, wash, magenta toner, wash, yellow toner, wash.

The air purge loop within this system is optional, as drainage of toning applicator 210 may be effected by other means, such as gravity flow. The use of an air purge loop through the various lines is preferable, however, as it allows for rapid, controlled removal of color toner from toning applicator 210. The air purge loop includes blower 212, pressure manifold 217, and valves 218–220 for purging of various drain and supply lines. An air jet cleaner is described in commonly assigned U.S. Pat. No. 5,231,455, which is incorporated by reference herein. A mixture of air and dirty wash fluid enters supply tank 22. Liquid 26 having contaminants may be gravitationally drained from supply tank 22 and enters to enter drum purifier 10. Alternatively, liquid may be drained from supply tank 22 by pressurization or vacuum. The air in supply tank 22 is removed via an outlet at or near the top of the same, and reenters the air lines and eventually the inlet of blower 212. An internal baffle may help reduce splatter within supply tank 22. In the same manner, the mixture of air and color toner that drains into toner receptacles 201–204 is separated by gravity. Air is removed from each toner receptacle through an outlet at the upper portion of the toner receptacle and reenters the air lines.

During a color pass, the toning process carries out some of the color pigment particles as visible image. The toner within the electrostatic printing system leaving toning applicator 210 is therefore somewhat diluted in terms of color pigment percentage. Therefore, color concentrate from concentrate bottles 221–224 may replenish the color toner in toner receptacles 201–204, as necessary.

After dirty wash fluid has passed through supply tank 22, it first enters drum purifier 10 and then second purifier to undergo the purification process of the present invention. Purified wash fluid, which is clear, low-conductivity isopar in this example, emerges from the second purifier and reenters wash fluid receptacle 211 for reuse in the system. The clear dispersant in receptacle 211 is thereby kept in a high purity, highly insulating condition. Mixing of a portion of the wash fluid into the toners therefore does not degrade the toners.

The electrostatic printing system depicted in FIG. 8 incorporates a continuous purification system. Each color toner pass and subsequent air purge leave approximately 0.17 U.S. fluid ounce in toning applicator 210. The washing process carries this 0.17 U.S. fluid ounce of color toner and any other paper debris or chemical contaminants received from the contact of toning applicator 20 and the printing surface out of toning applicator 210 and into the two purifiers. The clean wash fluid reenters wash fluid receptacle 211 and is reused for subsequent washing of toning applicator 210. After washing and air purging of the wash fluid, there remains as much wash fluid in the applicator, 0.17 to 0.35 U.S. fluid ounce, as there was toner after toner purging. Normally, each liquid is purged into its respective holding receptacle. Each toner receptacle has a level sensor, however, and, if the contents of a toner receptacle drop below a pre-determined level, the wash fluid may be purged into that receptacle to control the liquid level. In this way the liquid level in each toner receptacle is automatically controlled. The user need only resupply clear liquid dispersant to the wash fluid receptacle. This is a neat and clean process because colored toners are not involved. As needed, fresh bottles of concentrate may be replaced by simply unscrewing the empty bottle and replacing it with a new one. These new concentrate bottles may have neck seals consisting of thin foil. The new bottle is raised towards a mounting supply tank causing a concentrate withdrawal needle to penetrate the foil. The clean plastic cap from the new bottle is used to seal the empty bottle. Thus the replacement of concentrate is also a clean, non-messy process. As the user never has to handle toners themselves, operation of the printer is a clean process and suitable for an "office" environment. The applicator and associated plumbing is self-cleaning since it is washed by the wash fluid.

The amount of contaminants removed from a toner by the purification system during a color pass is proportional to the amount of toner left in the toning applicator after purging with air. By adjusting the time duration of air purging, this amount of residual toner can be controlled. It is believed that contact of the toner with the printing paper during a toning pass introduces a small amount of deleterious contaminants into the toner. Thus a fixed amount of contaminants is likely to be introduced per pass. On the other hand, the amount of contaminants removed per pass is proportional to the contaminant concentration. This means that the contaminant concentration will slowly build up until the amount removed per pass just balances the amount picked up per pass and the limit is approached asymptotically. By adjusting the air purging time, this steady-state contaminant level may be held to any desirable level. With very brief air purging, more toner is left behind to be intermixed with the wash fluid and removed from the system. This results in a lower steady-state contamination level. It also results in a larger amount of solid waste in the tray to be discarded, but the amount of waste is, at most, only a few grams per day. This is insignificant in comparison to the large amount of liquid waste produced in the prior art. The drum purifier lasts indefinitely and does not require replacement. The second purifier has long life depending on its size and composition, because most large particles have been removed before the liquid enters the second purifier. The continuous purification system described is similar to that disclosed in commonly assigned U.S. Pat. No. 5,404,210, which is incorporated by reference herein.

A user of an electrostatic printing system containing the purification system of the present invention need only throw out solid contaminants collected in waste tray 36, replace color concentrate bottles 221–224 because color pigment particles are used for the images printed and a small amount is lost through the purification system, and add wash fluid which is steadily lost to the printed paper and to some evaporation within the system. All of these tasks need only be performed on an occasional basis. In one week of operation of an electrostatic printer having the tandem purification system, at a rate of eighty large color prints per day, about two ounces of solid contaminants are collected and need to be discarded. The amount of waste and ease of removal of that waste represent a significant advancement over previous methods. The requirement of removing and disposing of large volumes of spent toner has been eliminated.

We claim:

1. A system for purifying liquid containing contaminants, said system comprising, a supply tank adapted to contain said liquid, an electrophoretic purifier means, in fluid communication with said supply tank, for separating solid contaminants from said liquid to produce a semi-purified flow of liquid, wherein said liquid forms a flow moving from said supply tank to said purifier means, and means, disposed between said electrophoretic purifier means and said supply tank, for removing, from said flow, gas bubbles having a diameter filling within a specified range, and a receptacle, in fluid communication with said electrophoretic purifier means, said receptacle adapted to collect said liquid after exiting said electrophoretic purifier means.

2. The system of claim 1 wherein said removing means is adapted to block passage therethrough of gas bubbles having an diameter greater than 0.0029 inch.

3. The system of claim 1 wherein said removing means is formed from screen material having a plurality of apertures.

4. The system of claim 1 wherein said removing means is formed from a nylon screen having a plurality of apertures.

5. The system of claim 1 wherein said removing means is formed from a nylon screen having a plurality of apertures, with each of said plurality of apertures formed from a plurality of intersections of thread having a diameter of 0.002 inch, providing each of said plurality of apertures with a width of 0.0029 inch.

6. The system of claim 1 wherein said electrophoretic purifier means includes a moving surface adherent to said contaminants, an electrode spaced apart from said moving surface 0.015 inch, defining a gap therebetween, with said gap adapted to receive said flow moving from said supply tank, and an air-knife positioned adjacent to said moving surface.

7. The system of claim 1 wherein said electrophoretic purifier means includes a moving body, having a circular cross-section, with the surface of said body being adherent to said contaminants, an electrode having a profile matching the profile of said surface and being spaced apart therefrom 0.015 inch, defining a gap therebetween, with said gap positioned to receive said flow moving from said supply tank, said removing means being formed from a nylon screen having a plurality of apertures, with each of said plurality of apertures formed from a plurality of intersections of thread having a diameter of 0.002 inch, providing each of said plurality of apertures with a width of 0.0029 inch.

8. The system of claim 1 further including a second purifier in fluid communication with said electrophoretic purifier means, said second purifier including a porous contaminant-retentive material with said semi-purified liquid traversing said porous material forming a purified flow substantially free of both particulate and nonparticulate contaminants.

9. The system of claim 1 further including a second purifier in fluid communication with said electrophoretic purifier means, said second purifier including alternating layers of porous and conductive layers and means, in electrical communication with said conductive layers, for biasing said conductive layers with respect to each other.

10. A system for purifying liquid containing contaminants, said system comprising, supply tank adapted to contain said liquid, an electrophoretic purifier means, in fluid communication with said supply tank, for separating solid contaminants from said liquid to produce a semi-purified flow of liquid, wherein said liquid forms a flow moving from said supply tank to said electrophoretic purifier means, said electrophoretic purifier means including a surface adherent to said contaminants, an electrode spaced apart from said surface, defining a gap therebetween, with said gap adapted to receive said flow moving from said supply tank, a receptacle, in fluid communication with said electrophoretic purifier means, and first means, disposed between said electrophoretic purifier means and said supply tank, for removing, from said flow, gas bubbles having a specified size, thereby preventing arcing in said electrophoretic purifier means.

11. The system of claim 10 wherein said surface is a moving surface and further including an air-knife with said air-knife positioned adjacent to said moving surface, said air-knife being adapted to focus an envelope of air onto said surface to remove liquid from contaminants adhered to said surface.

12. The system of claim 11 wherein said supply tank includes a fluid outlet and said removing means is formed from a first nylon screen, disposed proximate to said fluid outlet and includes a plurality of apertures, with each of said plurality of apertures formed from a plurality of intersections of thread having a diameter of 0.002 inch, providing each of said plurality of apertures with a width of 0.0029 inch.

13. The system of claim 10 further including a second purifier having a fluid inlet positioned to receive said semi-purified liquid exiting said electrophoretic purifier means, said second purifier including a porous contaminant-retentive material, adapted to further purify said semi-purified liquid, forming a purified liquid, with said receptacle positioned to collect said purified liquid.

14. The system of claim 13 wherein said second purifier includes alternating layers of porous and conductive layers and means, in electrical communication with said conductive layers, for biasing said conductive layers with respect to each other.

15. The system of claim 14 further including a second removing means consisting of a second nylon screen, disposed proximate to said fluid inlet said second nylon screen including a plurality of apertures, with each of said plurality of apertures fused from a plurality of intersections of thread having a diameter of 0.002 inch, providing each of said plurality of apertures with a width of 0.0029 inch.

16. A system for recycling liquid containing contaminants, said system comprising, an electrophoretic purifier means for separating contaminants from said liquid to produce a semi-purified flow of liquid, said electrophoretic purified means including a body, with the surface of said body being adherent to said contaminants, an electrode having a profile matching the profile of said surface and being spaced apart therefrom a distance in the range of 0.010 to 0.025 inch, defining a gap therebetween, an air-knife positioned adjacent to surface, said air-knife adapted to focus an envelope of air onto said surface to remove liquid from contaminants adhered to said surface, a supply tank with a fluid outlet, said supply tank being in fluid communication-with said electrophoretic purifier means and adapted to contain said liquid, wherein said liquid forms a flow moving through said outlet toward said electrophoretic purifier means, with said gap adapted to receive said flow moving from said supply tank, first means, disposed between said electrophoretic purifier means and said supply tank, removing, from said flow, gas bubbles having a specified size, thereby preventing arcing in said electrophoretic purifier means, and a second purifier having a fluid inlet positioned to receive said semi-purified flow of liquid exiting said electrophoretic purifier means, said second purifier including a porous contaminant-retentive material, producing purified liquid, and a receptacle, in fluid communication with said second purifier means, said receptacle adapted to collect said purified liquid after exiting said second purifier.

17. The system of claim 16 wherein said first removing means includes a first nylon screen having a plurality of apertures, with each of said plurality of apertures formed from a plurality of intersections of thread having a diameter of 0.002 inch, providing each of said plurality of apertures with a width of 0.0029 inch.

18. The system of claim 17 further including a second removing means consisting of a second nylon screen disposed proximate to said fluid inlet, said second nylon screen including a plurality of apertures, with each of said plurality of apertures formed from a plurality of intersections of thread having a diameter of 0.002 inch, providing each of said plurality of apertures with a width of 0.0029 inch.

19. The system of claim 18 wherein said second purifier includes alternating layers of porous and conductive layers and means, in electrical communication with said conductive layers, for biasing said conductive layers with respect to each other.

20. The system of claim 16 wherein said air-knife includes a body defining an air-channel having a longitudinal axis, with said longitudinal axis extending orthogonally to said surface.

* * * * *

UNITED STATES PATENT AND TRADEMARK OFFICE
CERTIFICATE OF CORRECTION

PATENT NO. : 5,656,146
DATED : Aug. 12, 1997
INVENTOR(S) : Gene F. Day et al.

It is certified that error appears in the above-identified patent and that said Letters Patent is hereby corrected as shown below:

Claim 1, col. 11, line 52, "diameter filling within a" should read -- diameter falling within a --.

Claim 10, col. 12, line 40, "supply tank" should read -- a supply tank --.

Claim 12, col. 12, line 65, "said removing means" should read -- said first removing means --.

Claim 16, col. 13, line 28, "electrophoretic purified means" should read -- electrophoretic purifier means --.

Signed and Sealed this

Sixteenth Day of December, 1997

Attest:

BRUCE LEHMAN

Attesting Officer

Commissioner of Patents and Trademarks